UNITED STATES PATENT OFFICE.

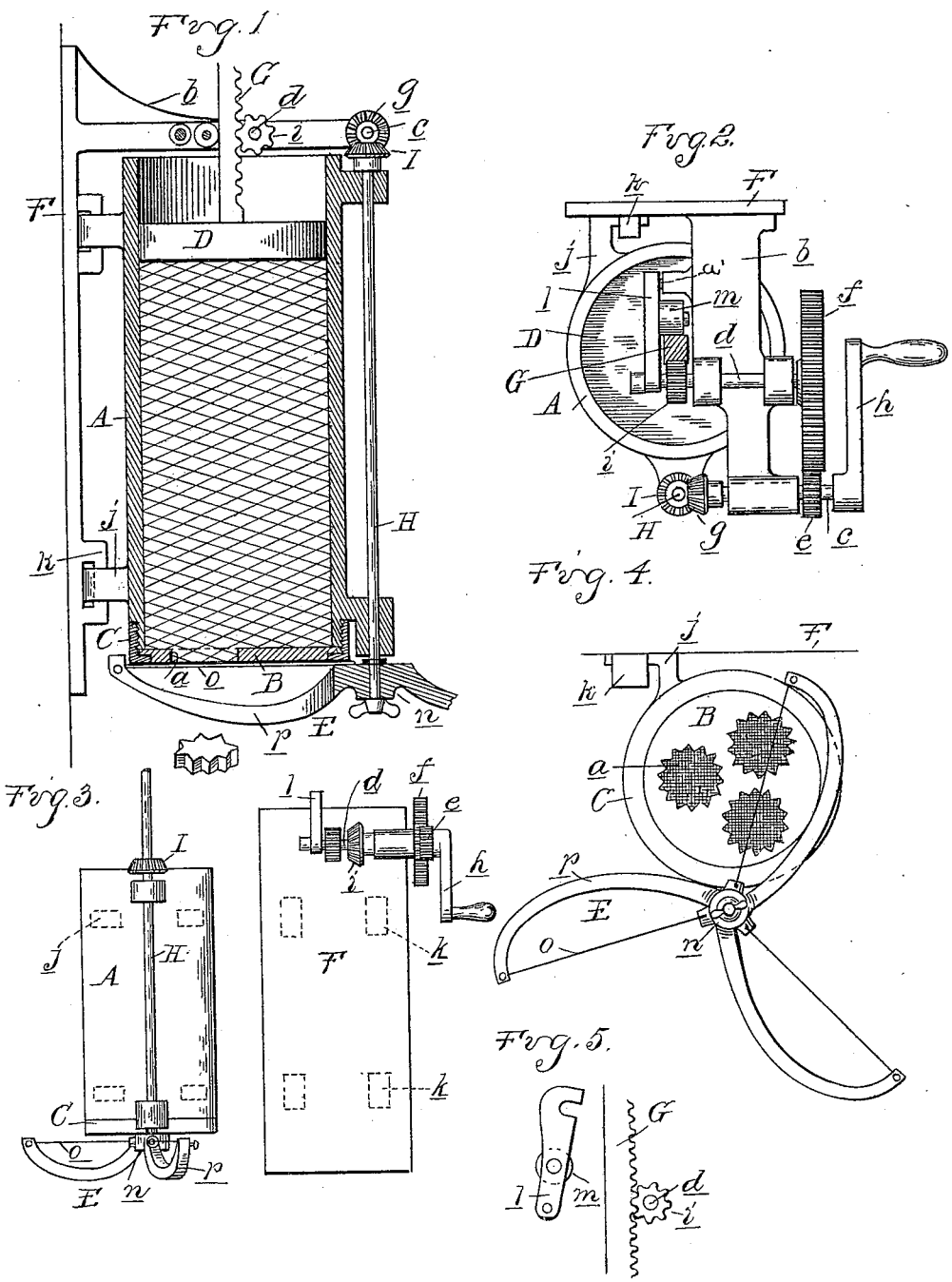

JOHN E. HUNSINGER, OF DETROIT, MICHIGAN.

BUTTER-FORMING MACHINE.

SPECIFICATION forming part of Letters Patent No. 622,048, dated March 28, 1899.

Application filed May 4, 1898. Serial No. 679,698. (No model.)

*To all whom it may concern:*

Be it known that I, JOHN E. HUNSINGER, a citizen of the United States, residing at Detroit, in the county of Wayne and State of Michigan, have invented certain new and useful Improvements in Butter-Forming Machines, of which the following is a specification, reference being had therein to the accompanying drawings.

It is the object of my invention to obtain a machine for quickly forming butter into small cakes or "pats" suitable for placing on individual butter-plates; and the invention consists in the peculiar construction, arrangement, and combination of parts, as more fully hereinafter described and claimed.

In the drawings, Figure 1 is a central longitudinal section through my machine. Fig. 2 is a plan view thereof. Fig. 3 is an elevation showing the manner of detaching the butter-holder from the machine. Fig. 4 is a bottom plan, and Fig. 5 is a detail view, of the securing means for the holder.

A is a cylindrical casing adapted to receive the butter to be formed. One end of this casing is open, and the other end is provided with an apertured end plate or forming-die B, preferably detachably secured in position by the clamping-ring C, having a screw-threaded engagement with the casing. This plate may be provided with one or more apertures $a$, which may be of any shape or size desired.

D is a piston or plunger adapted to fit in the casing and force the butter out through the aperture or apertures in the plate B, and E is a cutter adapted to be intermittently moved across the outer face of said plate to cut the columns of butter into short lengths to form pats of the proper thickness.

To feed the plunger and operate the cut-off, I provide suitable mechanism, which in the drawings is shown to be constructed as follows:

F is a suitable frame or supporting-plate, which is preferably secured permanently in position on the side wall of the room in which the machine is to be used. This frame is provided with a horizontally-extending lug or bracket $b$, in which are journaled the shafts $c$ and $d$, provided with the intermeshing gear-wheels $e$ and $f$. The shaft $c$ is also provided with the beveled gear-wheel $g$ and the actuating crank-handle $h$, and the shaft $d$ is provided with the pinion $i$.

G is an actuating rod or shank for the piston D, which is in the form of a rack which is adapted to mesh with the pinion $i$. The casing A is detachably secured in position on the plate F by means of lugs or feet $j$, adapted to be engaged by a lateral movement of the casing with sockets K on the plate, the rack G being at the same time engaged with the pinion $i$. To lock the parts in position, I preferably provide an arm $l$, pivotally secured to a stud $a'$ on the bracket $b$ and adapted to be turned down beside the rack G after the latter is in position. This arm also preferably carries an antifriction-roll $m$, which when the arm is turned down is brought to bear against the rear face of the rack to hold it in engagement with the pinion $i$.

The cut-off E is preferably in the form of a rotary head $n$, carrying one or more cutters. These may consist of thin knives; but I preferably employ a fine wire $o$, stretched between suitable clamps on an arm $p$ of the head, the drawings showing the head provided with three of these arms.

The head $n$ is mounted upon a shaft H, journaled in bearings upon the casing A, the upper end of said shaft being provided with a bevel gear-wheel I, adapted to mesh with the beveled gear-wheel $g$ when the casing is secured in position on the frame F.

In the operation of the machine the casing A is first filled with butter, the piston D inserted in the end thereof, and the casing then secured in position on the frame F, with the rack G in mesh with the pinion $i$ and the bevel-gear I in mesh with the bevel-gear $g$. The operator now turns the crank $h$, which, through the medium of the intermeshing gears $e$ and $f$, shaft $d$, and pinion $i$ and rack G, feeds down the piston D, pressing the butter out of the apertures $a$ in the plate B. At the same time motion is communicated through the bevel gear-wheels $g$ and I to the shaft H and head $n$, the latter causing the wires $o$ to be successively drawn across the bottom face of the plate B, cutting off the column of butter and allowing the separated pats to drop into a receiver (not shown) which is preferably filled with ice-water. The mechanism is so timed that in the interval between the successive cuts the butter column is fed downward sufficiently to make the pats of proper thickness. Although the piston moves continuously and the butter column is thus in motion while the cutters are moving across it, this does not interfere with the successful operation of the machine, as the wires *o* simply make parallel diagonal cuts through the column and the pats are of uniform thickness, though having their sides slightly inclined.

With a machine of this description the work of forming the pats is rapidly performed and without the necessity of any contact between the hands of the operator and the butter, which is a desirable feature.

When all of the butter is forced from the holder, the latter may be quickly removed from its support to be refilled or to be cleaned, when the operation is complete.

The thorough cleaning of the holder is facilitated by the detachable feature of the die-plate B, which also permits of exchanging this plate for one having apertures of different shape when desired.

What I claim as my invention is—

In a butter-forming machine, the combination of the frame attachable to the wall, provided with a laterally-extending arm or bracket, a cylindrical casing detachably secured to the frame below the bracket, a plunger, and a plunger-rod within the casing, a plunger-operating mechanism connecting the plunger-rod with said bracket and carried by the latter, and means for detaching said plunger-rod from the bracket to permit the casing to be removed from the frame after the plunger has reached the limit of its downward movement, substantially as described.

In testimony whereof I affix my signature in presence of two witnesses.

JOHN E. HUNSINGER.

Witnesses:
OTTO F. BARTHEL,
LIONEL BATTERSBY.